Oct. 11, 1955      E. A. KERLER      2,720,377
SOLIDS PACKING MACHINE
Filed June 4, 1951      3 Sheets-Sheet 1
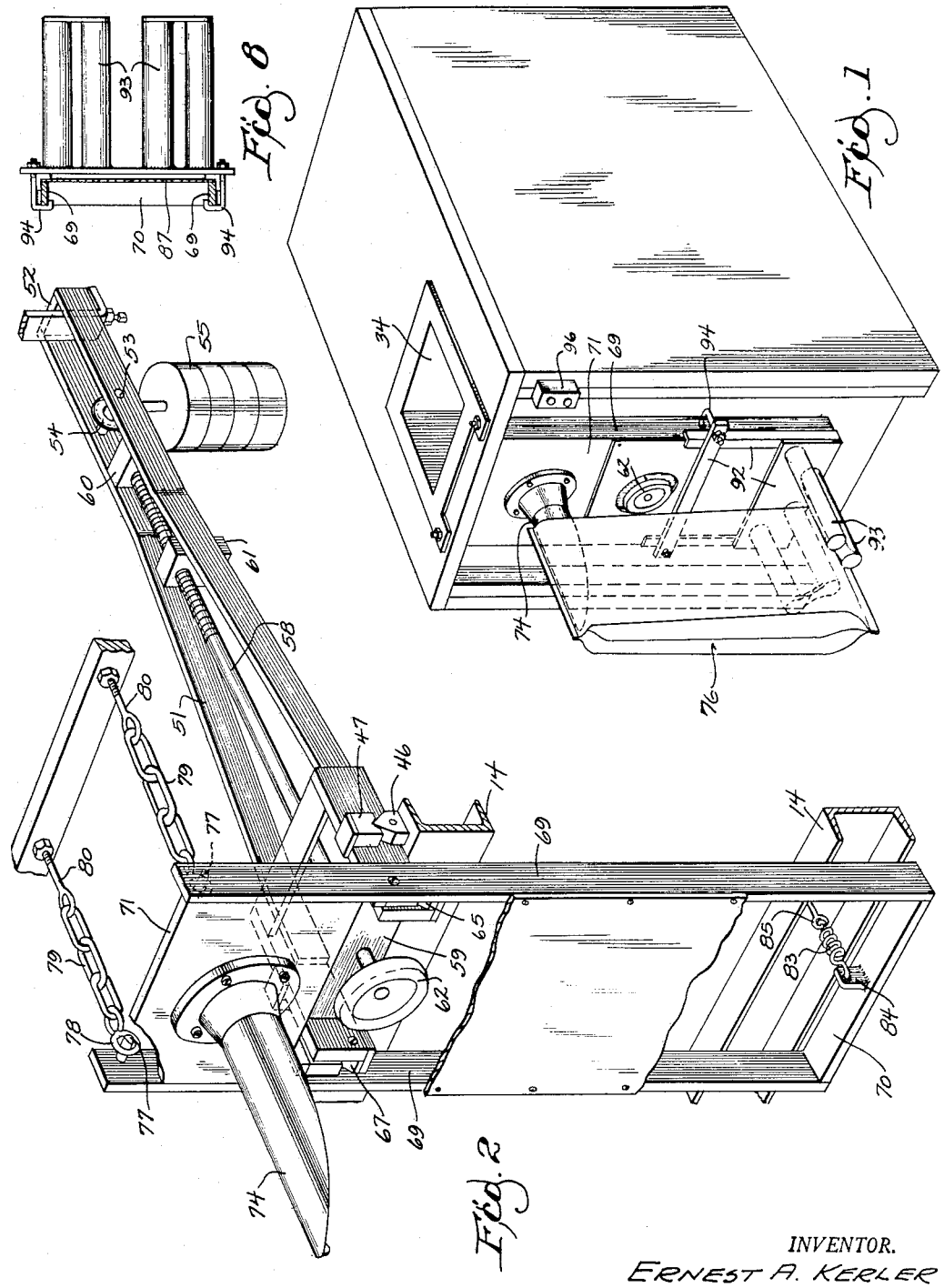
INVENTOR.
ERNEST A. KERLER
BY
*Miles Kenninger*
ATTORNEY

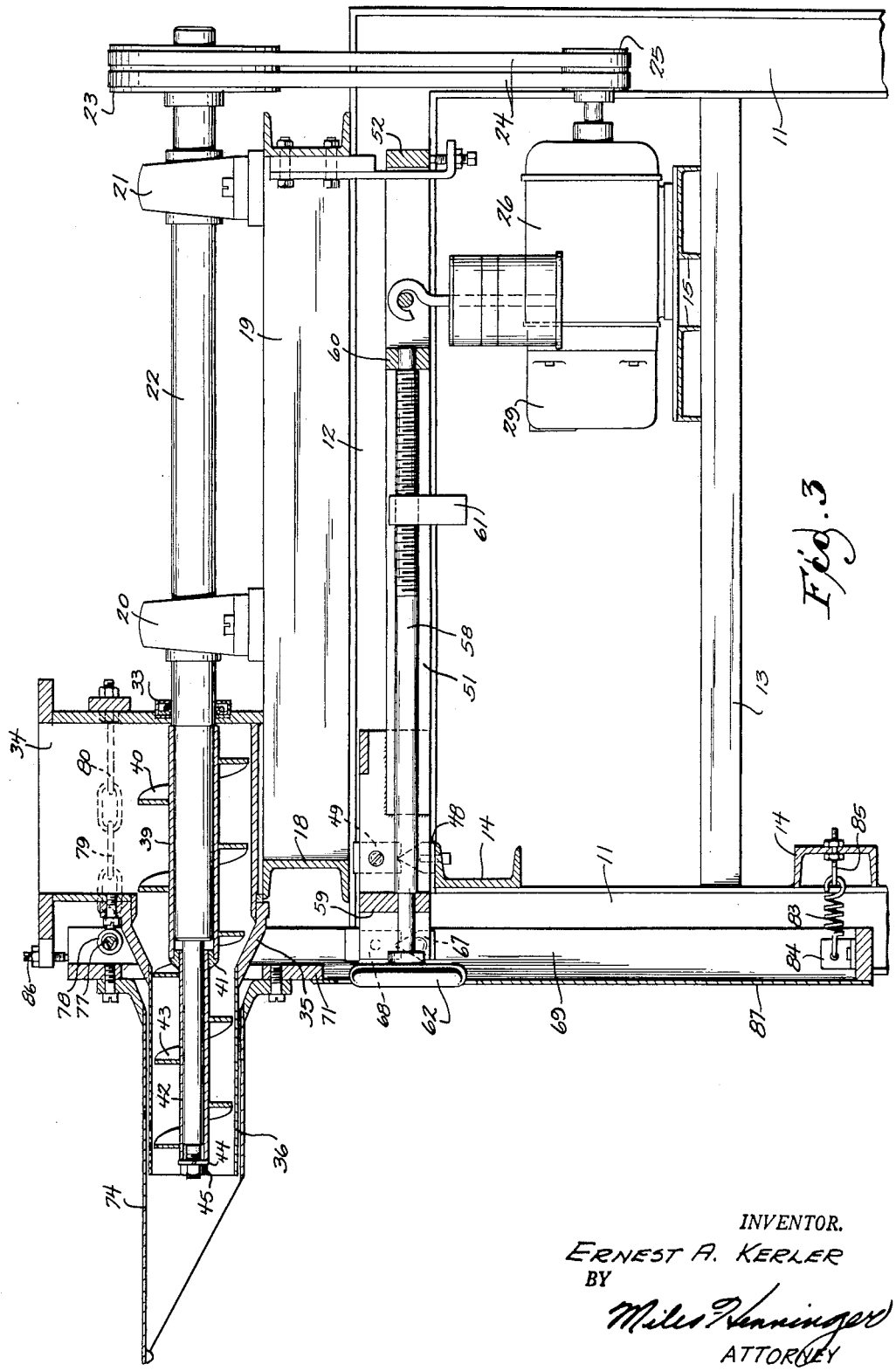

Oct. 11, 1955
E. A. KERLER
2,720,377
SOLIDS PACKING MACHINE
Filed June 4, 1951
3 Sheets-Sheet 3
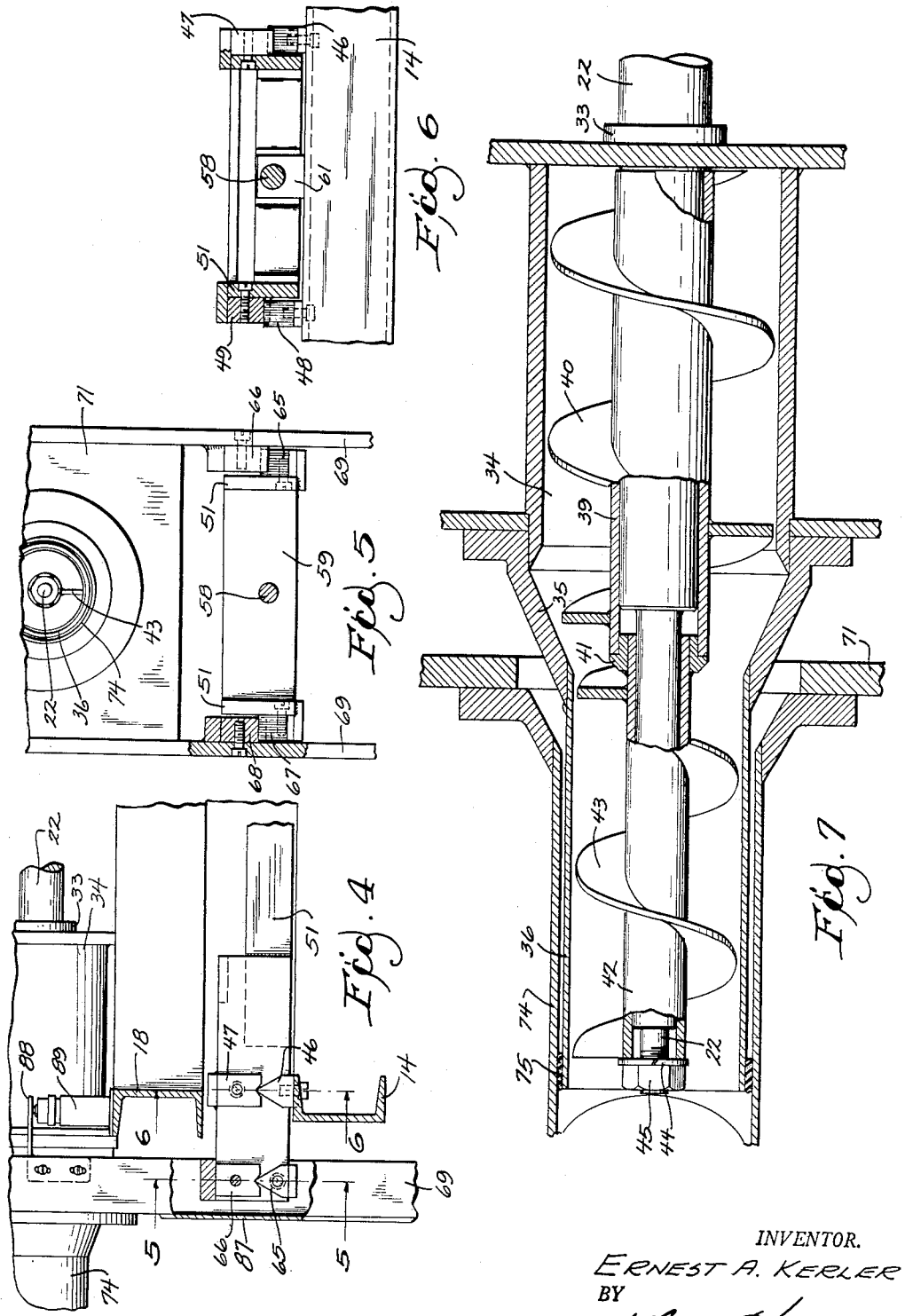
INVENTOR.
ERNEST A. KERLER
BY
Miles Henninger
ATTORNEY United States Patent Office 2,720,377
Patented Oct. 11, 1955

2,720,377

SOLIDS PACKING MACHINE

Ernest A. Kerler, Milwaukee, Wis., assignor to E. D. Coddington Mfg. Co., Milwaukee, Wis., a corporation of Wisconsin Application June 4, 1951, Serial No. 229,834

9 Claims. (Cl. 249—17)

This invention relates to improvements in means for filling valved bags or other containers with a fluent solid material and in which the material is weighed as it is placed in the container and the filling operation is automatically interrupted when a given weight content is reached.

The requirements for a packing machine usable for a wide range of products and conditions, or physical properties, are filling of the bags to a consistently accurate weight with an over-run of no more than a fraction of 1% of the total weight, minimized weighing mechanism oscillations to decrease the time required for reaching the exact desired weight, elimination of "dribbling" operation of the machine to secure the exact desired weight, minimized manual control of the machine, minimized power consumption, easy and quick cleaning and exchanging of the material conveying and processing mechanism for parts for handling and/or processing different materials, and complete filling of bags to minimize the size of bag required for a given weight.

Various laws and regulations require statement of the weight of the material when packed and provide penalties for underweight packages, and the packer desires to avoid excessive overweight which is a loss to him. The largest sources of error in weighing are varying density of a given material, change in rate of feeding the material to the bag or of processing the material, "over-run" of the material being packed, lack of sensitivity to power cut-off, change in balance beam relationship, and shifting of the material in the bag.

A packing, and processing, machine should be readily adaptable to various materials ranging from a relatively large particle size of dry and readily flowing material to a small particle size of wet and sticky material and to different processing conditions, which requires that the material conveying and/or processing parts be readily varied to suit the material. For the handling of material subject to oxidation, fermentation, enzymatic action and the like, and particularly for the handling of foods, it is essential that the parts of the machine in contact with the material be readily and completely cleanable.

The weighing mechanism should be movable for only short distances in approximately a straight line and should be damped so that bumps or jolts during filling of a bag will not cause oscillation of the balance beam and prevent steady approach of the weighing mechanism to exact balance. The balance beam should be pre-loaded or biased in one direction so that the balance beam relations will not change during the life of the machine and so that all weighing errors are either plus or minus a given weight and can thus be compensated. The power interrupting means should operate with the minimum of pressure and should have the minimum of inertia or time lag, and the drive for the machine should be interrupted as nearly instantaneously as possible to minimize "over-run" or bag filling beyond a predetermined weight.

It is therefore one object of the present invention to provide a machine for delivering a weighed amount of a fluent solid material to a container, in which all possible weighing errors are always of the same sign (plus or minus the given weight) and may be compensated for to arrive closely at the given weight.

Another object of the invention is to provide a machine for weighing the amount of material delivered into a container, in which balance beam movement is minimized, and the moment arms of the ends of the balance beam from the pivot axis for such beam, are kept substantially constant.

Another object of the invention is to provide a fluent solids packing machine in which the balance beam is divided into a number of parts which are pre-positioned relative to each other to avoid shifting of such parts due to shifting of the pivoting knife edges in the V-grooved pivot blocks.

Another object of the invention is to provide a packer for bags, of the screw conveyor type in which the effect on the weighing mechanism, of changes in the rate of material feeding or processing and of the piling of the material in the container, are so minimized as to avoid any effect on the weighing of the material.

Another object of the invention is to provide a machine for packing fluent solid materials into containers and utilizing a screw for conveying and processing within the machine, and in which the degree of over-run or supply of excessive amounts of material to the container, is minimized.

Another object of the invention is to provide a solids packing and/or processing machine of the type utilizing a screw and in which the screw is readily adaptable to the conveying and/or processing of materials of various sizes and of widely different physical characteristics, and is readily disassembled and re-assembled for cleaning or change in materials or processing conditions.

Another object of the invention is to provide a machine for packing and/or processing material, in which the production of dust and loss of material by other methods, is minimized.

And another object of the invention is to provide a simplified fluent solids packing and processing machine, in which the parts are rugged and so associated as to minimize maintenance work and to provide ready accessibility to all parts without danger that the packer may be misadjusted as a result of maintenance or repair work.

Objects and advantages other than those above set forth will be apparent from the following description when read in connection with the accompanying drawing in which:

Fig. 1 is a perspective view of a machine with a bag in place for filling.

Fig. 2 is a diagrammatic perspective view of the balance beam to show the relationships of the parts thereof to one another and to the main frame.

Fig. 3 is a longitudinal cross-section view on a vertical plane substantially centrally through the machine.

Fig. 4 is a vertical cross-sectional view to show the relationships of some of the four pairs of blocks forming the pivots for the balance beam.

Fig. 5 is a transverse sectional view on the plane of line 5—5 of Fig. 4.

Fig. 6 is a transverse sectional view on the plane of line 6—6 of Fig. 4.

Fig. 7 is an enlarged fragmentary view of the nozzle and bag support structure and of a sealing and balance beam damping means therebetween; and Fig. 8 is a horizontal sectional view of the weighing frame and of a bag holder mounted thereon.

Generally, the structure achieving the above results comprises a main frame and a sub-frame on which is fixed a hopper for the material to be handled. A balance beam is mounted on the main frame and comprises a weighing beam and a weighing frame which are, respectively, pivoted on the main frame and on the weighing beam by substantially frictionless knife edged blocks supporting V-grooved blocks and the parts mounted thereon. The weighing frame is pivoted intermediate its length and at one end of the weighing beam and to one side of the weighing beam pivoting axis and on a length of the weighing beam from the pivotal axis thereof which is much less than the length of the beam on the other side of such pivot axis. The weighing beam extends substantially horizontally and the weighing frame extends substantially vertically, and both the weighing beam and the frame are movable in a vertical plane. The weighing frame is pre-loaded by screws also limiting its movement about its pivot axis and kept in pre-determined relationship with the weighing beam by flexible members comprising a pair of chains attached at one end to the weighing frame sides and at the other end to the main frame, and a tension spring attached centrally to the other end of the weighing frame and to the main frame. All of the flexible members are connected with the weighing frame by substantially frictionless connections and the length of all of such members is readily adjustable to substantially the same value. The weighing frame thus has a pantograph-type motion and both the balance beam parts are consistently urged into a given relationship.

The hopper has a rigid and tubular discharge nozzle fixed thereon and includes the usual packing or processing and discharge sections. An electrical motor drives a screw for moving the material from the hopper and through the nozzle and for packing or processing material within the nozzle. Rotation of the motor is interrupted by a switch actuated by movement of the weighing frame and a switch is provided to restart the motor at the will of the operator. The nozzle is fixed against movement and extends in spaced relationship through the weighing frame and adjacent a bag support extending from the weighing frame, so that the nozzle and bag support are relatively movable. Passage of solid material into the space between the nozzle and the bag support is prevented by a highly compressible and expansible collar 75 mounted in such space. The collar 75 also absorbs bumps or shocks and damps weighing frame movement so that the weighing frame has a steady movement.

The screw conveyor mechanism comprises a shaft with one or more reduced diameter portions and with a threaded end at the discharge end of the nozzle, and a screw clamped on the shaft by a nut threaded on the shaft. The screw is thus readily removable and replaceable without disturbing other, and particularly bearing, relationships in the structure. Where the conveying function and packing or expanding, blending, mixing, beating, or other process steps are performed in the nozzle, it is desirable to have two or more screws and such screws may be of the same or different diameters and pitch. Because the nozzle is rigid, all of the above operations may be performed without danger of loss of material from the nozzle. Each of the screws includes a sleeve fitting over one of the reduced diameter portions of the shaft and a flight strip fixed on or formed as part of the sleeve to form the conveyor. The screws are locked on the shaft only by pressure exerted endwise on the screw sleeves against a shaft shoulder.

The bag support and the nozzle are connected with the hopper and weighing frame, respectively, by quick detachable connections so that all portions of the machine in contact with the material to be handled are readily accessible for cleaning and other maintenance or for exchange of the screws. An adjustable bag holder is mounted on the weighing frame and is a shelflike structure on which the bag (or other container) seats to provide slackness in the bag which avoids "bridging" or shifting of the material in the bag and allows complete filling of a bag rather than only a partial filling thereof.

Referring to the drawings by reference numerals in which like numerals designate like parts, the main frame includes two pairs of legs 11 joined by pairs of longitudinal members 12 and 13 and pairs of transverse members 14 and 15. On the longitudinal members 12 is mounted a sub-frame including end members 18 joined with side members 19 to provide support for a plurality of bearings 20 and 21 and a material receiving hopper and nozzle. The bearings 20, 21 support shaft 22 having a pulley 23 connected by belts 24 with a pulley 25 on the shaft of driving means. The driving means comprises an electric motor 26 mounted on the main frame members 15 and having combined therewith a brake indicated by the casing 29. The brake is electrically operated and is a well known article of commerce.

Shaft 22 extends through a seal 33 in one wall of a hopper 34 having an opening in the other wall through which the shaft extends. A tubular nozzle is fixedly connected by quick detachable means with the hopper and acts as a continuation of the hopper, the nozzle having a hollow frusto-conical compacting or processing section 35 and a tubular discharge section 36, the shaft 22 extending adjacent the end of the discharge nozzle section 36. A first screw is formed in part by a sleeve 39 readily slidable over the shaft to seat on a shaft shoulder and has a spiral screw flight 40 fixed on and extending outwardly from the sleeve. A connector ring 41 is adapted to pass over the smaller diameter portion of the shaft 22 to seat on one end of the sleeve of screw 39, 40 and is part of a second screw. The second screw is formed with a sleeve 42 slidable over the smaller diameter portion of the shaft 22 and with a screw flight 43 extending outwardly therefrom. It will be understood that the numbers of screws used will vary with the materials handled and the processing steps performed and will be mounted as described for the second screw.

The two screw sleeves are firmly pressed endwise and held on their respective seats by a washer 44 pressed on an end of the second screw by a nut 45 threaded on the end of the shaft. The shaft 22 and its screws coact with the hopper and nozzle to form means for conveying the material from the hopper, to process the material in the nozzle section 35 and to pass the material through and out of the discharge nozzle section 36. It will be noted that the nozzle 35, 36 is in effect one piece but that the processing section 35 is relatively heavy-walled, while the discharge section 36 is relatively thin-walled. The flange of the nozzle has key-hole slots for ready detachment from and re-attachment of the nozzle on the hopper wall. The nozzle and screw are therefore easily disassembled and reassembled for cleaning and for replacement of parts of different dimensions best adapted to a particular material or particular processing, and without danger of misadjustment of such parts.

The upper transverse main frame member 14 has fixed thereon two blocks 46 and 48 spaced from each other and adjacent the main frame longitudinal members 12. Such blocks are severally formed with somewhat pyramidal-shaped upper portions to provide an edge forming as nearly a line as is consistent with the weights to be handled and the conditions under which the machine must operate. The knife edge blocks severally and pivotally support a balance beam comprising a portion herein designated as the weighing beam and a portion designated as the weighing frame. The weighing beam includes side members 51 joined by members 52. Blocks 47 and 49 are severally mounted on the weighing beam side members to extend outwardly therefrom and are provided with V-grooves in their lower edges for respectively seating on the knife edges of blocks 46 and 48, the blocks 46, 47 and 48, 49 being herein designated respectively first and second pairs of pivot blocks. The edges of the blocks 46, 48 define a straight line so that the pairs of blocks provide substantially frictionless supports with only a minimum tendency to shifting of the edges in the grooves.

A pin 53 extends between the weighing beam side members and has pivotally mounted thereon a hanger 54 for counter-weights 55 which are graduated in size as is usual to give an approximate weight to be balanced. A threaded rod 58 is rotatably mounted in the weighing beam end members and cross-members 59 and 60 to support a threaded block 61 for movement toward and away from the weights 55 upon rotation of the rod by a hand wheel 62, the threaded block 61 thus serving as a fine adjustment for weights to be balanced. Suitable scale means may be provided adjacent the block 61, if desired, for calibrating the machine.

Third and fourth pairs of blocks are provided for mounting a weighing frame pivotally on the weighing beam. The third pairs of blocks comprise knife edge blocks 65 and 67 mounted adjacent the end of the weighing beam extending (toward the left as shown) from its pivot axis. The weighing frame includes side members 69 joined at one end by a cross-member 70 and at the other end by a cross-plate 71 having an aperture therethrough axially aligned with nozzle 35, 36 and of considerably larger size than the nozzle.

The weighing frame side members have severally mounted thereon V-grooved blocks 66, 68 coacting respectively with knife-edge blocks 65, 67 to form the third and fourth pairs of blocks for pivotally mounting the weighing frame on the weighing beam so that the former extends at a right angle to the latter. A member 74 is fixed on the weighing frame plate 71 to extend over the nozzle discharge section 36 and in spaced relation thereto for supporting a bag indicated at 76. The space between the nozzle and the bag support is partially occupied by a highly resilient collar 75 which prevents accumulation of material in such space. The flange on the bag support 74 is provided with key-hole slots for easy and quick detachment from and attachment of the bag support to the weighing frame plate 71.

The weighing frame is designed to move substantially only in a vertical direction with its vertical axis substantially parallel in both the "empty" and the "filled" bag positions. Such motion is obtained by a plurality of flexible and adjustable members connecting the main frame of the machine with the ends of the weighing frame. At the upper end of the weighing frame, the flexible members comprise a pair of knife edge pins 77 extending inwardly from the weighing frame side members 69, with the knife edges pointed away from the main frame. Pins 77 engage rings 78 on the ends of chains 79 which are attached at their other ends to adjustable eye-bolts 80 mounted in a portion of the hopper, the chains and the eye-bolts being parallel and spaced from the side of the hopper. At the lower end of the weighing frame, the flexible member comprises a helical tension spring 83 attached at one end to a lug 84 on the weighing frame cross-piece 70 and attached at the other end to an eye-bolt 85 adjustably mounted in the main frame cross-piece 14. The flexible member 77—80 and 83—85 are preferably adjusted to substantially the same length to limit tilting of the weighing frame relative to the weighing beam and to permit substantially vertical movement only of the weighing frame. The spring keeps the chains under tension so that the pairs of pivot blocks are always kept in the same relationships. That is, the knife edges of all of the pairs of blocks are maintained in corresponding positions in the V-grooved blocks. Adjustable screws 86 in a flange extending from the hopper, bear on the upper end of the weighing frame while the bag or other container is empty, thus pre-loading or pre-positioning both of the balance beam parts. Such pre-loading is obtained by coaction of the flexible members in retaining the balance beam parts in predetermined relation and the use of adjustable screws, all of which make certain that all of the errors in weighing are of the same sign and hence may be compensated. The weighing frame has only a small substantially vertical movement so that the lengths of the moment arms of the weighing frame and of the weighing beam have no appreciable effect on accuracy. It has been found that even containers for 25 pounds can be filled with an accuracy of 2 ounces which reduces "over-run" to a negligible amount.

The weighing frame has a cover 87 with an aperture for access to the hand wheel 62, the cover avoiding the possibility of a container catching on the sides or bottom of the weighing frame and thereby disturbing the smoothness of the filling operation. An adjustable arm 88 is mounted on the weighing frame to extend adjacent to and to operate a microswitch 89 by which the circuit of the motor 26 is interrupted and its brake is energized. There is no appreciable time lag in electric circuit control after movement of the weighing frame to the "weight" position, which also minimizes "over-run" and speeds up container filling. A holder is provided for adjustable attachment to the weighing frame to seat bags of various sizes and provide sufficient slack in the bag for easy flow of material to the bottom of the bag and for filling the bag or other container from the bottom. The holder comprises a frame 92 from which round bars or tubes 93 extend, the bars or tubes being joined in pairs at one end and providing a bracket or shelf on which spilled material cannot collect. Hook bolts 94 extend through the holder frame and the hooks grasp the side members 69 of the weighing frame, so that the holder is firmly but adjustably secured thereon. Filling of the container without jolts or shocks is thus obtained which contributes to the speed of the packing operation and allows complete filling of bags rather than only partial filling as frequently occurred heretofore. A starting switch is indicated at 96 on the front of the machine for convenience of the operator who also places and removes the bags.

The entire mechanism is enclosed by plates 97 to limit access of dust to the moving and operating parts and to guard such parts against contacts therewith. The machine may be further dust-proofed if desired, by providing a plate for the main frame portion underneath the weighing frame and by joining such plate with the weighing frame cover by a flexible tubular diaphragm enclosing the end of the weighing beam and the third and fourth pairs of blocks 65, 66 and 67, 78.

It will be noted that the pairs of pivot blocks are mounted to bring the knife edges in the same plane and with pairs of aligned edges in parallel. It will also be noted that all of the pivot blocks are mounted with the knife edge upward and that such edges are hooded by the V-grooved blocks which shield the pivot from accumulation of dust and accelerated wear due to the dust. A simple tension spring is therefore adequate to maintain a given relative position of the weighing frame and weighing beam. The maintenance of such relationship is most important as even a change of as little as .001 inch will produce a weight variation of up to 4 ounces at the leverages indicated in the drawings. Both the chains and the spring have only line contact with the weighing frame so that there can be no material change in the action of such parts over the normal life of the machine. The resilient sleeve between the nozzle and the bag support has the multiple functions of sealing the space, and of damping oscillations of the weighing frame. Such pre-positioning of the balance beam parts insures that any weighing errors will always be of the same sign so that they may be compensated for by adjustment of the machine. In operation, a bag 76 is first put into position on the bag support 74, counter-weights 55 are then placed on the weighing beam 51—54 and the block 61 is adjusted along the screw threaded rod 58, by turning hand wheel 62, until the weighing beam will move when a weight of exactly the desired value is added to the bag. Such addition of weights for determining the counter-weights 55 to be used and the position of the block 61, may be by the use of separate weights or by the use of a bag filled to the desired weight as determined by a separate weighing means. The material to be packed is now supplied to the hopper 34 to fill the hopper under pressure of the material and eliminate the possibility of large voids, small voids and air mixed with material having no effect on the machine. Switch 96 is now actuated by the operator of the machine to close the circuit to motor 26, which rotates screws 39—45. The screws move materially from the hopper through the nozzle 35, 36 into the bag, the portion 35 of the nozzle compacting the material to eliminate voids and air and to provide for discharge of material substantially as a solid of the size of the nozzle discharge 36. During filling of the bag, the weigh frame 69—71 moves downwardly in substantially a vertical plane and presses, by way of its pivots 65, 66 and 67, 68, on the forward end of the weigh-beam.

The above action continues until the weight of the bag and its contents overbalances the weigh-beam and its counter-weights, thereby causing rotation of the weigh-beam counter-clockwise about its pivots 46, 47 and 48, 49. When the arm 88 (on the weigh frame) presses on the micro-switch 89, such switch interrupts the circuit to the motor 26 and closes the circuit to the electrical brake 29. The brake absorbs the momentum of the motor rotor and the screws stop turning. In the present machine, the filled bag is then removed by the operator and the above cycle of starting and automatic operations is repeated.

Although but one embodiment of the present invention has been illustrated and described, it will be apparent to those skilled in the art that various changes and modifications may be made therein without departing from the spirit of the invention or from the scope of the appended claims.

I claim:

1. In a machine for packing containers with a fluent solid material, a main frame, a hopper fixed on the main frame, a weighing beam pivoted on the main frame for extension in substantially a horizontal direction, a weighing frame pivoted on the weighing beam for extension in a substantially vertical direction, a container support fixed on and extending from the weighing frame, a plurality of flexible and adjustable means in tension and connecting the main frame with the weighing frame for tending to retain the weighing frame in given relationship with the weighing beam, a nozzle fixed on the hopper and extending in spaced relation through the weighing frame and adjacent the container support, a power-driven screw conveyor extending through the hopper and the nozzle to the end of the latter, and means mounted on the main frame and actuated by the weighing frame for interrupting operation of the conveyor upon passage of a given weight of material through the nozzle into a container.

2. In a machine for packing containers with a fluent solid material, a main frame, a hopper fixed on the main frame, a weighing beam pivoted on the main frame for extension in substantially a horizontal direction, a weighing frame pivoted on the weighing beam for extension in a substantially vertical direction, a container support fixed on and extending from the weighing frame, a pair of flexible means pivotally connecting one end of the weighing frame with the main frame, a spring pivotally connecting the other end of the weighing frame with the main frame, the flexible members and spring being adjustable as to length and acting to tend to hold the weighing frame in a given relationship with the weighing beam.

3. In a machine for packing containers with given weight of a solid material, a main frame, a hopper fixed on the main frame, a weighing beam pivoted on the main frame for extension in substantially a horizontal direction, a weighing frame pivoted on the weighing beam for extension in a substantially vertical direction, a container support fixed on and extending from the weighing frame, a plurality of flexible and adjustable means connected at spaced points along the length of the weighing frame and connected with the main frame for tending to retain the weighing frame in given relation with the weighing beam, a nozzle fixed on the hopper and extending in spaced relation through the weighing frame and the container support, a power-driven conveyor extending through the hopper and the nozzle to the end of the latter, and means mounted on the main frame and actuated by the weighing frame for interrupting operation of the conveyor after passage of a given weight of material into the container.

4. In a machine for packing containers with given weight of a solid material, a main frame, a hopper fixed on the main frame, a weighing beam pivoted on the main frame for extension in substantially a horizontal direction, a weighing frame pivoted on the weighing beam for extension in a substantially vertical direction, a container support fixed on and extending from the weighing frame, a plurality of flexible and adjustable means severally connecting both ends of the weighing frame with the main frame for tending to retain the weighing frame in given relation with the weighing beam, a nozzle fixed on the hopper and extending in spaced relation through the weighing frame and the container support, a power-driven conveyor extending through the hopper and the nozzle to the end of the latter, and means mounted on the main frame and actuated by the weighing frame for interrupting operation of the conveyor after passage of a given weight of material into the container.

5. In a machine for packing containers with given weight of a solid material, a main frame, a hopper fixed on the main frame, a weighing beam pivoted on the main frame for extension in substantially a horizontal direction, a weighing frame pivoted on the weighing beam for extension in a substantially vertical direction, a container support fixed on and extending from the weighing frame, a plurality of flexible and adjustable means connecting the weighing frame with the main frame for tending to retain the weighing frame in given relation to the weighing beam, one of the means being of fixed length when under tension and the other of the means being resilient for tensioning the said one means, a nozzle fixed on the hopper and extending in spaced relation through the weighing frame and the container support, a power-driven conveyor extending through the hopper and the nozzle to the end of the latter, and means mounted on the main frame and actuated by the weighing frame for interrupting operation of the conveyor after passage of a given weight of material into the container.

6. In a machine for packing containers with given weight of a solid material, a main frame, a hopper fixed on the main frame, a weighing beam pivoted on the main frame for extension in substantially a horizontal direction, a weighing frame pivoted on the weighing beam for extension in a substantially vertical direction, a container support fixed on and extending from the weighing frame, a plurality of chains severally connecting one end of the weighing frame with the main frame for tending to retain the weighing frame in given relation with the weighing beam, means pivotally connecting one end of the chains with the weighing frame for reducing the pivotal friction, a tension spring connecting the other end of the weighing frame with the main frame, a nozzle fixed on the hopper and extending in spaced relation through the weighing frame and the container support, a power-driven conveyor extending through the hopper and the nozzle to the end of the latter, and means mounted on the main frame and actuated by the weighing frame for interrupting operation of the conveyor after passage of a given weight of material into the container.

7. A machine for packing containers with given weight of a solid material, a main frame, a hopper fixed on the main frame, a weighing beam pivoted on the main frame for extension in substantially a horizontal direction, a weighing frame pivoted on the weighing beam for extension in a substantially vertical direction, a container support fixed on and extending from the weighing frame, a pair of chains connecting the weighing frame with the main frame, rings on the weighing frame and adjacent one end thereof, edged pivots severally mounted on one end of the chains for bearing of the edge thereof on the rings, a tension spring pivotally connected with the other end of the weighing frame and connected with the main frame, a nozzle fixed on the hopper and extending in spaced relation through the weighing frame and the container support, a power-driven conveyor extending through the hopper and the nozzle to the end of the latter, and means mounted on the main frame and actuated by the weighing frame for interrupting operation of the conveyor after passage of a given weight of material into the container.

8. In a machine for packing containers with a predetermined weight of fluent solid material, a main frame, a hopper fixed on the main frame, a weighing beam pivoted on the main frame for extension in substantially a horizontal direction, a weighing frame pivoted on the weighing beam portion on one side of the pivot thereof and for extension in a substantially vertical direction, weights for placement on the weighing beam portion on the other side of the pivot thereof, a container support fixed on and extending from the weighing frame, means mounted on the hopper and adjustable to limit movement of the weighing frame and weighing beam for acting counter to the weights tending to move the weighing beam from substantially horizontal position, means for limiting movement of the weighing frame from substantially vertical position, a nozzle fixed on the hopper and extending through the weighing frame and the bag support, a power-driven screw extending through the hopper and the nozzle, and means mounted on the main frame and actuated by the weighing frame for interrupting operation of the screw upon movement of the weighing beam out of horizontal position.

9. In a machine for packing containers with a predetermined weight of fluent solid material, a main frame, a hopper fixed on the main frame, a weighing beam pivoted on the main frame for extension in substantially a horizontal direction, a weighing frame pivoted on the weighing beam portion on one side of the pivot thereof and for extension in a substantially vertical direction, weights for placement on the weighing beam portion on the other side of the pivot thereof, a container support fixed on and extending from the weighing frame, a plurality of screws retained on the hopper and adjustable to bear vertically on the weighing frame for limiting movement of the weighing beams by the weights for substantially horizontal positioning of the weighing beam, means for limiting movement of the weighing frame from substantially vertical position, a nozzle fixed on the hopper and extending through the weighing frame and the bag support, a power-driven screw extending through the hopper and the nozzle, and means mounted on the main frame and actuated by the weighing frame for interrupting operation of the screw upon movement of the weighing beam out of horizontal position.

References Cited in the file of this patent

UNITED STATES PATENTS

| Number | Name | Date |
|---|---|---|
| 711,934 | Bond | Oct. 28, 1902 |
| 800,632 | Curtain | Oct. 3, 1905 |
| 954,302 | Johnstone | Apr. 5, 1910 |
| 1,382,359 | Holbert | June 21, 1921 |
| 1,548,321 | Jaenichen | Aug. 4, 1925 |
| 1,629,860 | Bushman | May 24, 1927 |
| 1,659,389 | Cameron | Feb. 14, 1928 |
| 1,701,830 | Ward | Feb. 12, 1929 |
| 1,766,444 | Marsh | June 24, 1930 |
| 2,360,776 | Kozak | Oct. 17, 1944 |
| 2,404,884 | Pieper | July 30, 1946 |
| 2,548,075 | Stoker | Apr. 10, 1951 |